US008046378B1

(12) United States Patent
Zhuge et al.

(10) Patent No.: US 8,046,378 B1
(45) Date of Patent: Oct. 25, 2011

(54) UNIVERSAL QUOTA ENTRY IDENTIFICATION

(75) Inventors: John Zhuge, San Jose, CA (US); Paul Yuedong Mu, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 649 days.

(21) Appl. No.: 11/862,138

(22) Filed: Sep. 26, 2007

(51) Int. Cl.
G06F 7/00 (2006.01)
G06F 17/30 (2006.01)

(52) U.S. Cl. .......................... 707/783; 707/823; 707/959

(58) Field of Classification Search .................. 707/783, 707/823, 959
See application file for complete search history.

(56) References Cited

U.S. PATENT DOCUMENTS

| | | | |
|---|---|---|---|
| 5,956,734 A | 9/1999 | Schmuck et al. | |
| RE40,187 E * | 3/2008 | Abraham et al. | 709/224 |
| 2002/0133491 A1 | 9/2002 | Sim et al. | |
| 2003/0009484 A1 | 1/2003 | Hamanaka et al. | |
| 2005/0044198 A1 | 2/2005 | Okitsu et al. | |

OTHER PUBLICATIONS

Gud, Amit et al., "Elastic Quota File System (EQFS)," Department of D.Y. Patil College of Engg., Dec. 4, 2005, downloaded from http://people.cis.ksu.edu/~gud/docs/ppt/eqfs_ppt.pdf.
Leach, P. et al., "A Universally Unique Identifier (UUID) URN Namespace," The Internet Society, Jul. 2005, downloaded from Http://www.ietf.org/rfc/rfc4122.txt on Aug. 9, 2007.
"IT Value Card Published: Dec. 2005, Microsoft File Server Resource Manager," Microsoft Corporation, Dec. 2005.

* cited by examiner

Primary Examiner — Khanh Pham
Assistant Examiner — Ann Chempakaseril
(74) Attorney, Agent, or Firm — Blakely, Sokoloff, Taylor & Zafman LLP

(57) ABSTRACT

An apparatus and a method for determining whether a quota has been violated by using a platform-identification value, instead of the platform-specific identification value. The method may include receiving a quota-sensitive data request from a user at a data storage system, which includes a platform-specific identification value. The method further includes performing a lookup operation on a first data store using the platform-specific identification value to determine a platform-independent identification value that corresponds to the user, and translating the platform-specific identification value into a platform-independent identification value. The first data store includes multiple entries that map multiple platform-specific identification values that correspond to the same user on different platforms to the same platform-independent identification value. Once the platform-specific identification value is translated, the quota-sensitive data request is determined whether a quota is violated using the platform-independent identification value.

17 Claims, 5 Drawing Sheets

UNIVERSAL QUOTA ENTRY IDENTIFICATION

RELATED APPLICATIONS

This application is related to "Multiple Node Quota Filter," Ser. No. 11/862,136, filed herewith, which is commonly assigned to the assignee of the present application.

TECHNICAL FIELD

This invention relates to the field of network data storage systems and, in particular, to quotas used in network data storage systems.

BACKGROUND

Various forms of network data storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system typically includes at least one storage server, which is a processing system configured to store and retrieve data on behalf of one or more client processing systems ("clients"). A typical storage server manages one or more logical data container storing data, such as a volume. A volume is a logical data set which is an abstraction of physical storage (e.g., disks) or parts thereof into a single logical storage object, and which is managed as a single administrative unit, such as by a file system layer. A volume may be defined from a larger group of available storage, such as an aggregate. A volume may be logically broken down into logical data sets (storage objects), which may contain one or more Redundant Array of Independent/Inexpensive Disks (RAID) groups. An aggregate is a logical aggregation of physical storage, such as a logical container for a pool of storage, combining one or more physical mass storage devices (e.g., disks) or parts thereof into a single logical storage object, which contains or provides storage for one or more other logical data sets at a higher level of abstraction (e.g., volumes). A file system layer, which manages the underlying file system, is an application-level programmatic entity, which imposes a structure (e.g., hierarchical structure) on files, directors and/or other data contains stored and/or managed by a storage server, and which services read/write requests from clients of the storage server.

Storage administrators need a method to define and limit the amount of storage that is used by individuals who have access to a shared data storage resource. The administrator may wish to limit storage to particular individuals for administrative reasons, financial reasons, or the like. The administrators may also wish to control the rate of growth of data stored in the storage system. In order to limit the amount of storage used by an individual, some file systems, managed by the file system layer, have a quota of storage resources that can be used by a user to limit the storage usage by a user on a volume. A quota is a limit on the amount of storage resources that can be allocated to the user. There are different types of quotas, for example, usage quota, block quota, file quota, or inode quota. Usage and block quota limit the amount of disk area that can be used. File and inode quotas limit the number of files and directories that can be created. Specific quotas can be applied to individual users, or alternatively, a default user quota can be established that applies to all users utilizing space within the volume. An inode stores basic information about a file, directory, or file system object. Quotas may also be applied to a group of users in a similar manner as with individual users. That is, a system or storage administrator defines a usage or file quota specific to a certain user or group of users. Alternatively, quotas may be implemented for other entities than an individual user or a group of users, such as Human Resources (HR), Engineering, or the like. In addition, administrators typically define a warning level, i.e., soft quota, at which users are informed they are nearing their limit, which is less than the effective limit, i.e., a hard quota. Also, there may be a grace interval, which allows users to temporarily violate their quotas by certain amounts if necessary. In defining and implementing quotas on storage server, an administrator can prevent one user from consuming an entire file system's resources, or create a system of tiered access, in which users can have different levels of restriction. The quotas may be used, for example, to provide different levels of service based upon the needs of individual clients.

One problem with implementing quotas in some conventional systems is that quota-sensitive data requests received at a storage server of the system may include dissimilar types of identification values that identify the type of platform from which the data request originated. A platform describes a framework, either in hardware of software, which allows software to run. Typical platforms include a computer's architecture, operating system, or programming languages and their runtime libraries. For example, the platforms may be UNIX®, WINDOWS°, or the like. Each data request received from a specific platform includes a platform-specific identification value. When the storage server receives multiple requests from a user from various platforms, the conventional systems become more complex, since the conventional system have to track various quota-sensitive data requests, including dissimilar types of identification values, from various platforms for each of the users. For example, the user A performs a create-file-access request by way of the storage server from a first client implementing the UNIX platform, and later performs a write-access request from a second client implementing the WINDOWS platform. The first access request includes an identification value to identify the user on the first platform, while the second access includes a different identification value to identify the same user, but from the second platform. Also, platform-specific identification values may be derived from within the storage server, for example, Quota Tree Identification (TID) values. A TID value is the identification of a quota tree, which is a top-level directory used to provide a simple form of directory quota. Examples of data requests received from various specific platforms includes data requests from a UNIX platform including a UNIX user Identification (UID) value or a UNIX Group user Identification (GID), from a WINDOWS platform including a Common Internet File System (CIFS) Windows Security Identification (SID), and from other platforms, such as a platform using the Data ONTAP® storage operating system software, available from Network Appliance of Sunnyvale, Calif., including a TID value. Since the storage server receives various data requests with different types of identification values for a single user, it becomes difficult for an administrator to maintain the quota for the user.

SUMMARY OF INVENTION

Described herein are an apparatus and a method for determining whether a quota has been violated by using a platform-independent identification value, instead of the platform-specific identification value. The method may include receiving a quota-sensitive data request from a user at a data storage system. The data request includes a platform-specific identification value and is based on a platform from which the quota-sensitive data request originated. The method further includes performing a lookup operation on a first data store using the platform-specific identification value to determine a platform-independent identification value that corresponds to the user, and translating the platform-specific identification value of the quota-sensitive data request into the platform-independent identification value. The first data store includes multiple entries that map multiple platform-specific identification values that correspond to the same user on different platforms to the same platform-independent identification value. Once the platform-specific identification value is translated, a second lookup operation may be performed on a second data store using the platform-independent identification value to determine whether a quota of storage resources assigned to the user is violated by the quota-sensitive data request. The second data store includes an entry, which is identified by the platform-independent identification value, includes a quota limit of storage resources for the user and a total usage of storage resources used by the user.

BRIEF DESCRIPTION OF THE DRAWINGS

The present invention is illustrated by way of example, and not by way of limitation, in the figures of the accompanying drawings.

DETAILED DESCRIPTION

Figure 1:
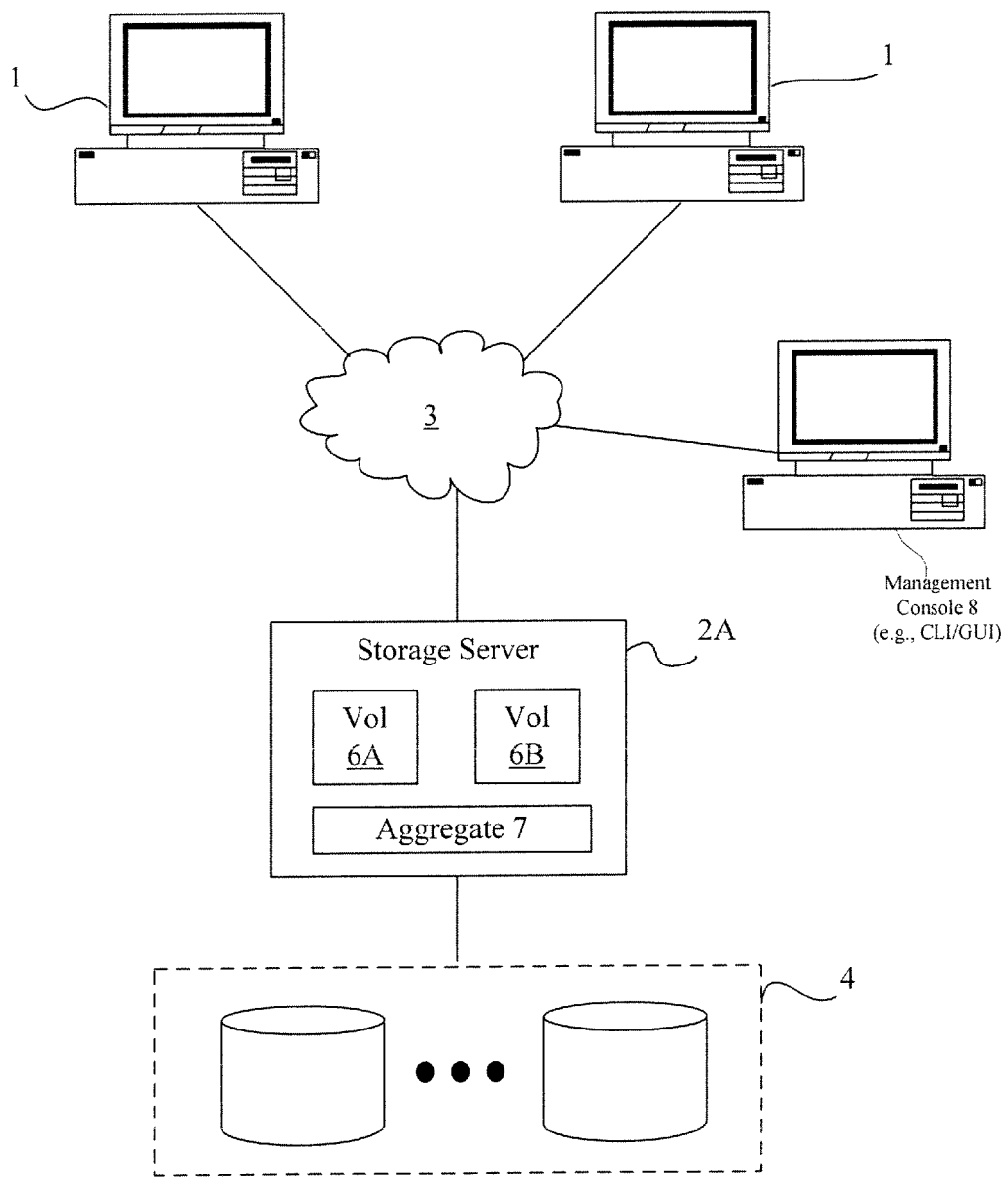
FIG. 1 illustrates a storage network environment.

Described herein are apparatuses and methods that implement a quota management system that translates platform-specific identification values into platform-independent quota identification values to determine whether a quota-sensitive data request violates a quota using the platform-independent identification value. The embodiments described herein can be used to support any number and any type of platform-specific identification values into one quota entry ID that is platform independent. As described in more detail below, the embodiments described herein can be used to allow introduction of new types of entries into the quota system from new or already existing platforms, and to simplify and streamline the implementations of the quota system by using Universal Quota Entry Identification (UQEID) values.

The embodiments described herein may be used in a database manager that manages a quota policy database and an ID mapping database. By implementing an ID mapping database with the quota policy database allows greater flexibility in adding new ID types, and mixing or grouping various types of IDs. Although the embodiments described herein are described with respect to a quota policy database, alternatively, other embodiments of the present invention may be used in other system that include a quota policy database, for example, quota policy databases that are used for switching, routing, Quality of Service (QoS), or the like. The embodiments of the present invention may also be used in a policy database of a charge-back application, as described below. A charge-back system keeps track of system and storage usage of a particular user or group, and charges the particular user or group based on the usage.

The platform-independent quota identification value, which is also referred to herein as UQEID, is a unique ID created and used in a quota management system to track each individual quota policy entry. Each quota policy entry includes an ID portion and a policy limit portion, as described below. With UQEID, quota system information is maintained in a set of databases, such as a quota policy database that tracks quota limits and usages, and a mapping database that maps other IDs to UQEID, e.g., UID-to-UQEID mapping. The ID may be a user ID, such as UID, which used in UNIX operating system, GID, which is used to identify a group in the UNIX operating system, TID, which is used as a quota tree identification in Data ONTAP storage server operating system, available from Network Appliance of Sunnyvale, Calif., or SID, which is used a security ID in the WINDOWS operating system.

The quota policy database may include a primary key for an entry based on the UQEID, and the entry may include such information as the block limit, soft block limit, file limit, soft file limit, blocks used, files used, or the like. The mapping database may include a primary key for an entry based on the received ID (e.g., UID) that maps the ID to the UQEID. The UQEID may be generated using a 32-bit or 64-bit counter to ensure that the UQEID is never reused. Alternatively, the UQEID may be Universally Unique Identifier (UUID) Uniform Resource Name (URN) Namespace (128-bit) generated according to the RFC 4122 Internet standards track protocol.

The embodiments described herein may be implemented in any file system, such as a file system having a well-defined quota lookup and management layer, in a protocol layer, in a file system layer, or alternatively, as a pluggable quota filter or a file system quota filter. The quota management system communicates with a quota database manager. The quota database manager can be implemented on another node than the quota management system (e.g., an additional storage server), or alternatively, on the node itself (e.g., storage server), to manage a quota policy database. Each node in a storage system can access the same quota policy database, which is managed by the quota database manager. It should be noted that although the embodiments described herein are described as implementing the quota in a quota policy database that is managed by a quota database manager, the quota may also be implemented in other types of data stores as known to those of ordinary skill in the art. Similarly, the ID mapping database may be implemented in other types of data stores. Also, it should be noted that the quota policy database may include a quota configuration database that defines the quota limits of the quota, and a runtime usage database that tracks the total usage by the user. These databases may be stored in separate databases, or alternatively, in a single database. Similarly, other types of data stores may be used to store information for quota configuration and the runtime usage.

In one embodiment, the quota management system sits in the client-to-storage data path of a storage server, and can monitor the data path for quota-sensitive data requests that may affect the quota for the user. The quota management translates the platform-specific identification value into the platform-independent identification value, and checks the data request against the quota to determine if the data request violates the quota. The quota management checks the data requests using the platform-independent identification value, instead of the platform-specific identification value. By monitoring the quota-sensitive data access requests, the quota management system can determine the total usage of storage resources for a particular user using the platform-independent identification value, and update the quota policy database using the platform-independent identification value. By accessing the quota policy database using the platform-independent identification value, the total usage for the user on the entire storage system can be determined and compared against the quota, as defined by a quota policy. This allows the user to be limited to the quota, such as by denying access for the current data access request requested by the user on the client.

In operation, the user issues a create-file-access request to the storage server operating system, such as a UNIX user creating a file using Network File System (NFS) protocol, or a WINDOWS user creating a file using Common Internet File System (CIFS) protocol. The storage server operating system consults the quota management system to extract the ID (e.g., UID, GID, or SID) from the data request, to lookup the UQEID from the related ID mapping database using the ID, to lookup the quota policy entry in the quota policy database using the UQEID, and to use information from the quota policy entry to determine whether the quota would be violated (e.g., met or exceeded) by the data request. If the quota is reached, the storage server operating system denies the request and exits. If the quota is not reached, the storage server operating system fulfills the request by creating a new file in the file system of the storage server. The storage server operating system then updates the quota information in the quota policy database. The storage server operating system can use a cached copy of the UQEID to lookup the quota policy entry in the quota policy database, and update the field by incrementing the field, e.g., files used, to reflect the updated information. The storage server operating system, after updating the quota information responds successfully back to the user.

In operation, the quota management system monitors data access requests from the client 1 to check for quota-sensitive data access requests against quota for the given user or group. Examples of quota-sensitive data access requests may include creating a new file, deleting an existing file, writing to an existing file to append the data of the existing file, or the like. If the quota (e.g., hard or soft quota) is violated, based on the quota definition, certain system rules can be executed in response. Alternatively, other types of file system data access requests or a combination of file system data access requests can be designated as quota-sensitive data access requests. Although at least some of the embodiments described herein are described with respect to implementing a quota over multiple volumes, embodiments may also be implemented over multiple directories across one or more nodes.

In one embodiment, a storage server receives a quota-sensitive data request, including a platform-specific identification value, from a user. The platform-specific identification value is based on a platform from which the quota-sensitive data request originated. After receiving the quota-sensitive data request, the storage server translates the platform-specific identification value into a platform-independent identification value for the user. Translating the platform-specific identification value into the platform-independent identification value may include performing a lookup operation in an identification mapping database. The identification mapping database includes entries for multiple platform-specific identification values that correspond to the user on multiple platforms that map to the single platform-independent identification value that correspond to the user for the quota management system. In one embodiment, the storage server creates a particular platform-independent identification value for a particular user in an identification mapping database. The various platform-specific identification values, corresponding to the data requests received from the user from various platforms, are mapped to the particular platform-independent identification value for the particular user. For example, the data requests may be received from a UNIX platform include UID value or a GID value, from a WINDOWS platform are a SID, and from other platforms, such as a platform using Data ONTAP storage operating system software, include a TID value.

Using the platform-independent identification value, the storage server determines whether the quota-sensitive data request violates a quota. The storage server can determine and track a total usage of storage resources by a particular user based on the platform-independent identification value that has been assigned to the user. The total usage of storage resources by the user is compared against the quota defined for the user according to the quota policy.

In another embodiment, the storage server receives multiple data requests at different times from the same user from multiple platforms. Each of the data requests includes a platform-specific identification value that is representative of the particular platform from which the data request originated. The storage server translates the multiple platform-specific values for each of the data requests into the single UQEID value that corresponds to the user. The total usage by the user is determined and tracked based on the UQEID. For example, a lookup operation in a quota policy database using the UQEID value may be performed to obtain quota entry information for the user. The storage server compares the total usage by the user (e.g., using the obtained quota entry information) against the user's quota to determine whether the data request would met or exceed the quota. If the quota would be violated, a system rule is executed by the storage server; otherwise, the storage server processing the data request if the quota is not met. The system rule indicates an action that is to be performed in response to the violation of the quota policy. The system rule can be stored in memory of the storage server, or alternatively, in memory of the database manager. The quota information is updated after executing the system rule or after processing the data request. For example, another lookup operation may be performed in the quota policy database using a cached copy of the UQEID value from the identification mapping database. The cached copy allows the expediting of the lookup operation for subsequent lookup operations once the platform-independent identification value has been determined for a particular platform-specific identification value. The quota policy entry in the quota policy database may be updated by increasing a value in a field indicating an amount of files or blocks is used by the user.

When a soft quota warning level is violated, the storage system can send the user, as well as possibly the administrator, a message indicating that the user is approaching the quota specified for the particular user. In one embodiment, no other action is taken when the soft quota is violated. However, when the hard quota level is about to be violated, the storage system can prevent the data access request (e.g., disk write data access requests) that would result in hard quota violations from completing successfully. Alternatively, the storage system can wait until the quota has been violated before denying the access request. The user is typically notified through the failed access request (e.g., failed write access request) with an error message generated by the violating applications, while the administrator may also receive a notification of the violation as well. In another embodiment, a grace interval may be used to allow a user to temporarily violate their quotas (e.g., hard quota) by certain amounts if necessary. The grace interval allows the user to temporarily violate their quota by a predetermined amount, such as a grace interval threshold. The predetermined amount may be stored in the quota configuration database 42A. Alternatively, the predetermined amount may be stored in memory of the storage server. Even if the grace interval allows the user to temporarily violate their quota, a system rule can be executed, such as, for example, generating a warning that the user has exceeded the quota assigned to the user. This warning may be sent to the user, or alternatively, to the administrator.

In one embodiment, the logical data flow for implementing volume set quota includes the administrator setting up quota for a user A for a set of volumes (e.g., volume set), or for a set of directories (e.g., directory set). For instance, the quota may be for a volume set, including volume A from node A and volume B from node B, or for a directory set, include directory 1 and directory 2 of node A. In one embodiment, the node is a storage server. The storage server may be a file server, which is sometimes called a "filer," which can provide clients with block-level or file-level access to data stored on the storage devices. Alternatively, the node is another type of server, such as a client-based server. In another embodiment, the storage system includes multiple nodes, such as multiple storage servers in a storage server cluster. Alternatively, other types of nodes in cluster or non-cluster configurations may be used.

The quota set up by the administrator can be configured for either block quota, inode quota, or the like. In one embodiment, the quota for a volume set or a directory set is stored in a quota policy database, which is accessible by each node of the storage system. A quota management system is disposed in each data path of each node, such as node A and node B of a cluster configuration. That is, there are two instances of the quota management system that can access the quota policy database. When a quota-sensitive data access request is received at node 2A, the quota management system instance of the particular node performs quota operations based on the particular quota-sensitive data access request to determine how the total usage of storage resources for the particular user is affected with respect to the defined quota for the user. The quota operations are performed using the UQEID values. For example, the quota management system calculates the affected blocks or inodes of the operation and compares the resulting total volume set usage or the total directory set usage with the allowed quota for the user A. The total volume set usage may be calculated by adding usage totals of each volume for the user A via the quota management system and the quota policy database. When the volume set quota is met for the user A, a system rule can be executed. One system rule is to deny the current quota-sensitive data access request. In another embodiment, a warning may be generated. In one embodiment, certain balancing may be done to ensure each volume usage doesn't surpass a certain percentage of total volume quota. Alternatively, no balancing is performed. The total directory set usage may be calculated by adding usage totals of each directory for the user A via the quota management system and the quota policy database. When the directory set quota is met for the user A, a system rule can be executed, such as denying the current quota-sensitive data access request, or generating a warning. The quota operations for the directory set quota are performed using the UQEID values.

Storage Node Network Environment

FIG. 1 shows a network environment in which the invention can be implemented. A node 2A (e.g., storage server) is coupled locally to storage devices 4, which includes multiple storage devices (e.g., disks). In one embodiment, the node 2A is a storage server. Alternatively, the node 2A is another type of server, such as a client-based server. The node 2A is also coupled through a network 3 to a number of storage clients 1 (hereinafter simply "clients"). The storage devices 4 are managed by the storage server 2A. The storage server 2A receives and responds to various read and write requests from the clients 1, relating to volumes, directories, logical unit numbers (LUNs), files, blocks and/or other units of data stored in (or to be stored in) the storage devices 4.

In one embodiment, a user interface implemented on a management console 8, may be provided to allow an administrator to access the storage server 2A. The user interface may be implemented on a computer, such as the management console 8 that is connected to the storage system, and may be, for example, a command line interface (CLI) and/or a graphical user interface (GUI).

The node 2A may be a processing system that is configured to store and retrieve data on behalf of one or more client processing systems, such as the clients 1. In the context of NAS, the storage server may be a file server. In one embodiment, the node 2A is a storage server, made by Network Appliance, Inc. of Sunnyvale, Calif. In a SAN context, the storage server provides clients with block-level access to stored data, rather than file-level access. Some storage servers are capable of providing clients with both file-level access and block-level access, such as certain storage servers made by Network Appliance, Inc. of Sunnyvale, Calif.

Each of the clients 1 may be, for example, a conventional personal computer (PC), workstation, or the like. The clients 1 may be general-purpose computers configured to execute software applications. Each client 1 may communicate with the nodes over the network 3 by exchanging data according to pre-defined protocols, such as Transmission Control Protocol/Internet Protocol (TCP/IP). Moreover, the client 1 may interact with the nodes in accordance with a client/server model of information delivery. That is, the client may request the services of the node, and the system may return the results of the services requested by the client, by exchanging data over the network 3. The clients 1 may issue commands and data using file-based access protocols, such as the CIFS protocol or NFS protocol, over TCP/IP when accessing information in the form of files and directories. Alternatively, the client may issue commands and data using block-based access protocols, such as the Small Computer Systems Interface (SCSI) protocol encapsulated over TCP (iSCSI) and SCSI encapsulated over Fibre Channel Protocol (FCP), when accessing information in the form of blocks.

In one embodiment, the node 2A is a storage server used in a NAS mode. In another embodiment, the node 2A is, a block-based storage server such as used in a SAN. In another embodiment, the node 2A is a storage server which can perform both file-level access and block-level access for clients. Alternatively, the node 2A may be another type of server in a cluster or non-cluster configuration. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol, or another protocol or a combination of protocols.

The storage devices 4 may store data represented in an active file system of the storage server 2A. The active file system is a file system to which read and write data access requests can be made. The file system layer 21 is an application-level programmatic entity or layer which imposes the hierarchal structure on the data sets, such as the files, directories and/or other data containers stored and/or managed by a storage server, and which services read and write requests from clients of the storage server. The storage devices 4 may be, for example, conventional magnetic disks, optical disks, such as CD-ROM or DVD based storage, magneto-optical (MO) storage, or any other type of non-volatile storage devices suitable for storing large quantities of data. The storage devices in the storage devices 4 can be organized as one or more RAID groups, in which case the node 2A accesses the storage devices 4 using an appropriate RAID protocol.

Storage of information can be implemented as one or more storage "volumes", such as volume 6A and volume 6B of node 2A, each of which includes a set of one or more physical disks managed cooperatively to define an overall logical arrangement of disk space on the volume(s). Alternatively, the storage of information may be implemented in other configurations other than volumes. A volume is a logical data set which is an abstraction of physical storage, combining one or more physical storage devices or parts thereof into a single logical storage object (e.g., data storage unit), and which is managed as a single administrative unit, such as single file system. Typically, file systems have a one to one mapping to volumes where volumes can be constructed from one or more storage devices (e.g., disks). Typically, a volume management layer, which is separate from the file system layer, handles the arrangement of storage devices and provides the appearance that a single volume exists to the file system layer. Each volume is generally, although not necessarily, managed as a separate file system. Each volume stores a copy of a data set, and each node has its own data sets as well as has access to the other node's data sets. It should be understood that while only two nodes are shown in the illustrative cluster configuration, it is expressly contemplated that any other number of nodes and volumes may be connected in a cluster or non-cluster configuration. It should also be noted that although the volumes 6A and 6B and aggregate 7 are illustrated in the storage server 2A of FIG. 1, the volumes 6A and 6B and aggregate 7 are presented on the storage server, while the content of the volumes 6A and 6B and aggregate 7 reside on the storage devices 4.

Figure 2:
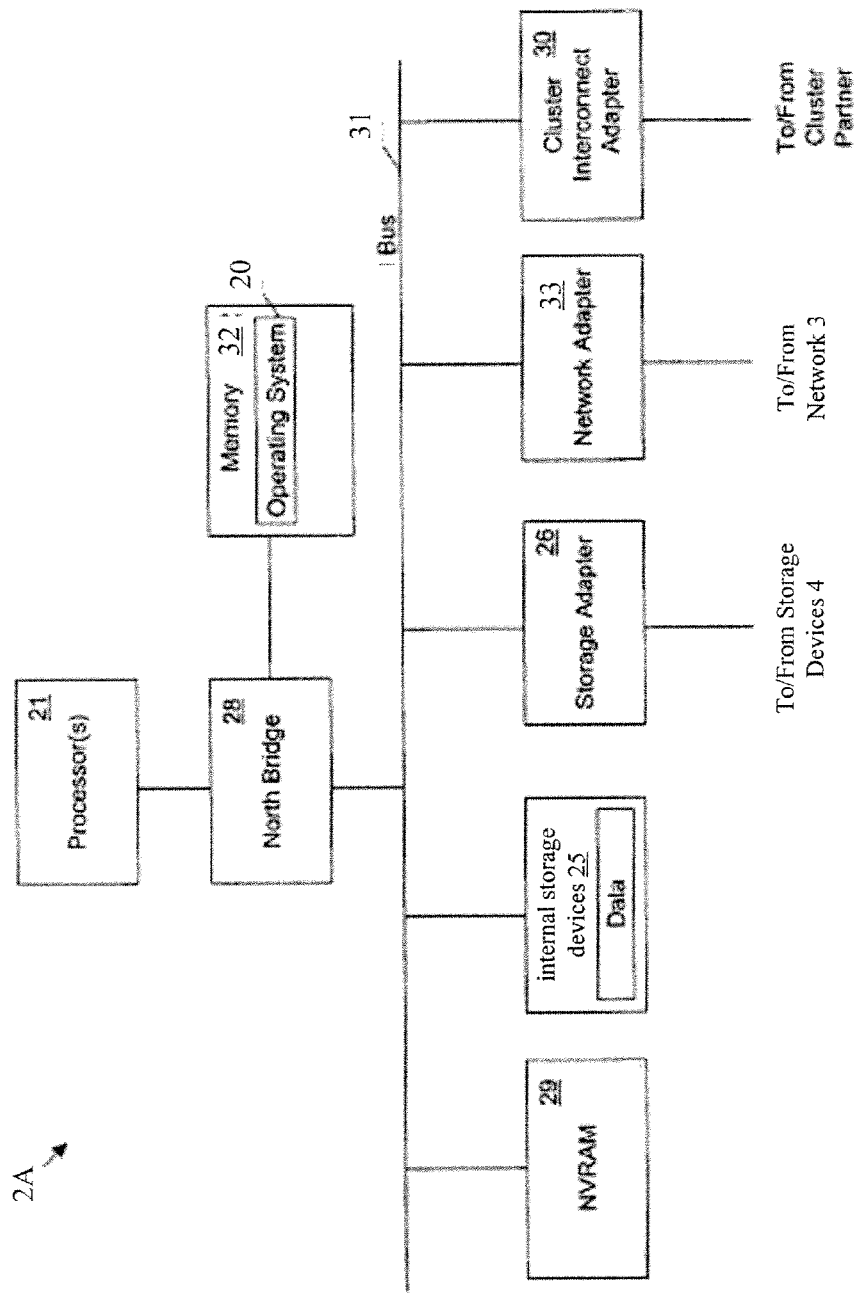
FIG. 2 is a block diagram of one embodiment of the architecture of a storage server.

FIG. 2 is a block diagram of one embodiment of the architecture of a storage server. The storage server 2A includes one or more processors 21 and a system memory 32 coupled to each other by a north bridge 28. The north bridge 28 is also coupled to a bus 31 (e.g., Peripheral Component Interconnect (PCI) bus). The north bridge 28 provides an interface between peripheral components on the bus and the processors 21 and system memory 32.

Each processor 21 is a central processing unit (CPU) of the storage server 2A and, thus, controls the overall operation of the storage server 2A. In certain embodiments, a processor 21 accomplishes this by executing software stored in system memory 32. Such software may include the operating system 20 of the storage server 2A. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 32 is a random access memory (RAM) which stores, among other things, the operating system 24 of the storage server 2A, in which the techniques introduced herein can be implemented.

Connected to the bus 31 are a non-volatile memory 29 (e.g., NVRAM 29), which stores the non-volatile data of the storage server 2A (e.g., storage server and associated storage devices); one or more internal storage devices 25; a storage adapter 26; a network adapter 33; and a cluster interconnect adapter 30. The NVRAM 29 is configured to store information about the storage server and associated storage devices, such as, for example, a record of write requests received from clients since the last consistency point may be stored in NVRAM.

Internal storage devices 25 may be or include any conventional medium for storing large volumes of data in a non-volatile manner, such as one or more disks. The storage adapter 26 allows the storage server 2A to access the external storage devices 4 and may be, for example, a Fibre Channel adapter, a SCSI adapter, or the like. The network adapter 33 provides the storage server 2A with the ability to communicate with remote devices such as the clients 1 over a network and may be, for example, an Ethernet adapter, or the like. The cluster interconnect adapter 30 provides the storage server 2A with the ability to communicate with its cluster partner. It should be noted that the cluster interconnect adapter can also be implemented in the same physical components as the storage or network adapters 26 and 33.

Figure 3:
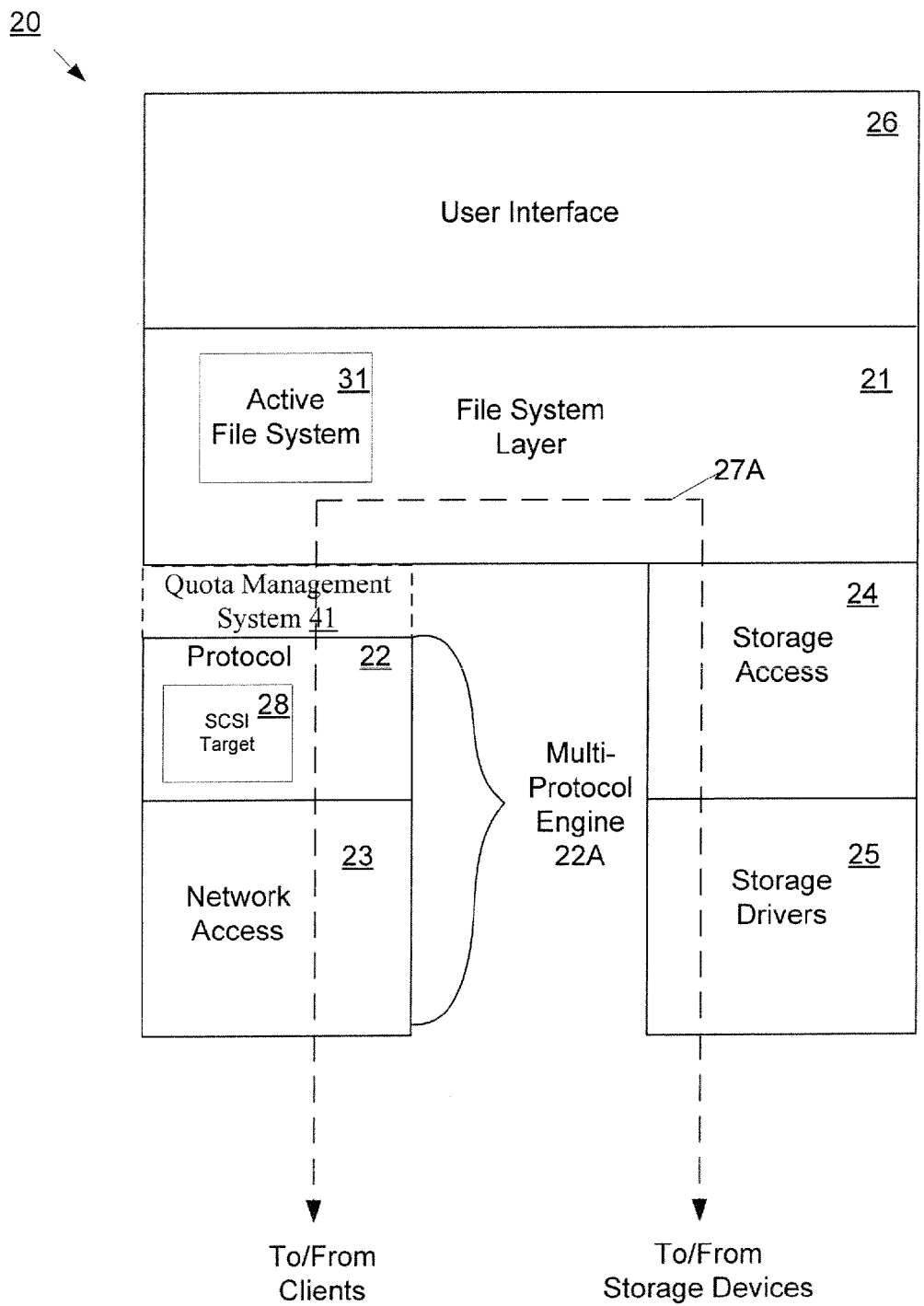
FIG. 3 illustrates one embodiment of the architecture of the operating system of the storage server of FIG. 2.

FIG. 3 shows one embodiment of the architecture of the operating system of the storage server 2A of FIG. 2. As shown, the operating system 20 includes several software modules, or "layers". These layers include a file system layer 21. The file system layer 21 is an application-level layer which imposes a structure, e.g. a hierarchy, on files and directories and/or other data containers stored by the storage server 2A and which services read/write requests from clients 1, among other functions. This hierarchy is referred to as the "active file system" 31. Logically "under" the file system layer 21, the operating system 20 also includes a protocol layer 22 and an associated network access layer 23 to allow the storage server 2A to communicate over the network 3 (e.g., with clients 1). The protocol layer 22 implements various higher-level network protocols, such as NFS, CIFS, Hypertext Transfer Protocol (HTTP), Fibre Channel Protocol (FCP), Internet SCSI (iSCSI), and/or other Upper Layer Protocols (ULP). In addition, assuming the storage server 2A is configured to operate in a SAN, the protocol layer 22 can also include a SCSI target layer 28, to enable the storage server 2A to receive and respond to SCSI I/O operations (i.e., read and writes). For block level access, the protocol layer 22 may be split in half where the bottom half represents the transport protocols iSCSI and FCP, and the top half is the common SCI target layer. The network access layer 23 includes one or more drivers which implement one or more lower-level protocols to communicate over the network, such as Ethernet, or TCP/IP. The network access layer may include TCP/IP stack as well as the lower level data link layer which includes the physical interfaces like Ethernet, a host bus adapter (HBA) which may provide a Fibre Channel interface, or the network adapter 33. The protocol layer 22 and the network access layer 23 can be collectively referred to as a multi-protocol engine 22A.

Also logically under the file system layer 21, the operating system 20 includes a storage access layer 24 and an associated storage driver layer 25, to allow the storage server 2A to communicate with the storage devices 4. The storage access layer 24 implements a higher-level disk storage protocol, such as an implementation of RAID, while the storage driver layer 25 implements a lower-level storage device access protocol, such as Fibre Channel Protocol (FCP) or small computer system interface (SCSI). Also shown in FIG. 3 is the path 27A of data flow, through the operating system 20, associated with read or write operations of the attached storage devices.

The operating system 20 also includes a user interface layer 26 logically on top of the file system layer 21. The user interface layer 26 may provide a command line interface (CLI) and/or a graphical user interface (GUI) to various storage server functions, to allow an administrator to manage the storage server 2A. For example, the user interface layer 26 is coupled to the management console 8 to provide a user interface to an administrator on the management console 8.

The storage server 2A has an active file system 31, which is created and managed by the file system layer 21 of the operating system 20. In one embodiment, the file system layer 21 is the WAFL® (Write Anywhere File Layout) file system, available from Network Appliance, Inc. of Sunnyvale, Calif. Alternatively, other file systems may be used.

Universal Quota Entry Identification

As described above, the embodiments described herein implement a quota management system that translates platform-specific identification values into platform-independent quota identification values to determine whether a quota-sensitive data request violates a quota using the UQEID value. The quota limits a user or a group of users to a defined amount (e.g., quota) of storage resources (e.g., amount of disk space, number of files or directories, inode consumption, block consumption, or the like) of the storage system. As described in more detail below, the embodiments described herein can be used to allow introduction of new types of entries into the quota system from new or already existing platforms, to support of any number and any type of platform-specific identification values into one quota entry ID that is platform independent, and to simplify and streamline the implementations of the quota system by using UQEID values.

Figure 4:
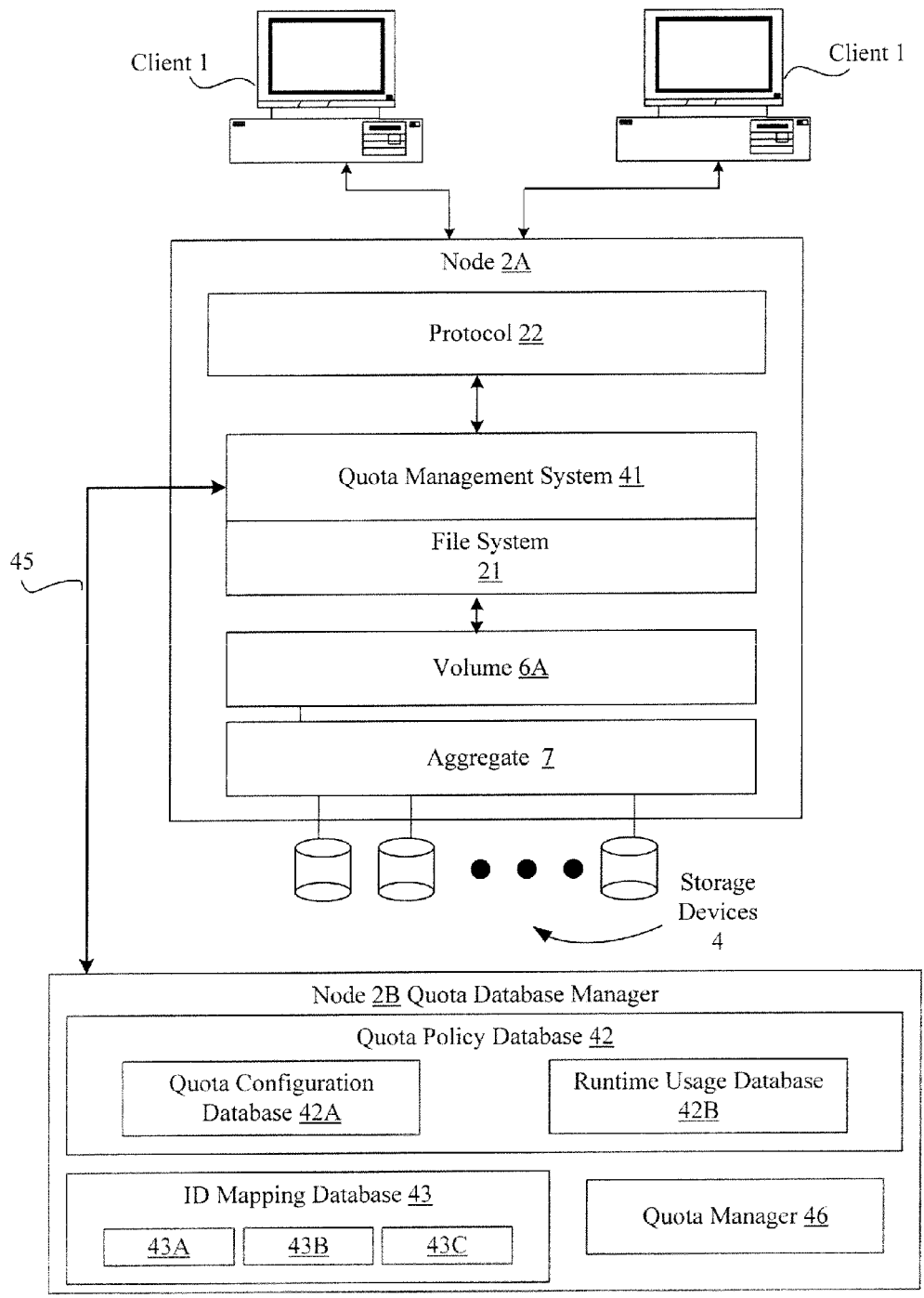
FIG. 4 is a block diagram of one embodiment of a node implementing a quota management system that translates platform-specific identification values into platform-independent quota identification values.

FIG. 4 is a block diagram of one embodiment of the node 2A implementing a quota management system 400 that translates platform-specific identification values into platform-independent quota identification values. In this embodiment, the node 2A is a storage server that implements the quota management system 400. That is, the storage server 2A executes the quota management system 41 in coordination with a quota policy database 42 and a universal quota mapping database 43 (also referred to herein as an ID mapping database, which is managed by an identification mapping database, or UQEID mapping database). In one embodiment, the quota policy database 42 and the ID mapping database 43 reside on the same node and are managed by a single quota database manager 2B. In another embodiment, the quota policy database 42 is managed by a quota database manager, and the ID mapping database 43 is managed by separate database manager, such as an identification mapping database manager. The quota database manager is configured to track quota and a total usage for the user using the UQEID value in the quota policy database 42, and the ID mapping database manager is configured to map multiple platform-specific identification values for a user to the UQEID value for the user in the ID mapping database 43 (e.g., identification mapping database). Alternatively, the quota database manager may be implemented on the client 1.

In one embodiment, the quota policy database 42 includes a quota policy entry for the user that is identified by the UQEID value. The quota policy entry may include information, such as, for example, a total usage of storage resources for the user, and the quota, which could include hard- and/or soft-quota definitions for the user. The total usage may include the block usage or file usage, and the hard or soft limit includes a limit on the block or file usage.

In one embodiment, the identification mapping database 43 includes an entry for each of the various platform-specific identification values that map the platform-specific identification values to the UQEID value. Alternatively, the entry may include additional information to identify the user associated with the specific platforms and the UQEID value.

In the embodiment of FIG. 4, the quota management is implemented using a quota management system 41 that is disposed in the data path of the node 2A. The quota management system 41 can access both the quota policy database 42 and the ID mapping database 43. Alternatively, the quota management may be implemented in other layers of the operating system of the node 2A, or in external nodes or external subsystems.

In one embodiment, a quota policy is implemented in a quota database manager that stores the quota policy database 42 and the ID mapping database 43. In one embodiment, the quota database manager is implemented in a second node. Alternatively, the quota policy database 42 and ID mapping database 43 may be implemented on the same node as the quota management system 41. The quota policy database 42 and ID mapping database 43 may be managed by the same or separate quota database managers. In one embodiment, the quota database manager is a server implementing the Data ONTAP® GX operating system, available from Network Appliance of Sunnyvale, Calif., to implement a relational database (RDB), which stores both the total usage of storage resources, as well as the quota of storage resources for the storage system using the UQEID values. Alternatively, other types of devices may be used. The quota database manager 2B includes a quota manager 46 which is executed on one or more processors and stored in system memory (not illustrated). Although the one or more processors and system memory are not illustrated in FIG. 4, the one or more processors execute software stored in system memory, as known to those of ordinary skill in the art. The quota database manager 2B may be a storage server, as described with respect to FIGS. 1-3, or alternatively, may be another type of server that manages the quota policy database 42 and the ID mapping database 43. The total usage of storage resources may include total usage of disk space that is used by the user, number of files or directories used that is used by the user, total inode consumption, or the like. It should be noted that the total usage may be calculated by the quota manager 46 and stored in the quota policy database 42. The quota manager 46 may also manage the quota policy as stored in the quota policy database 42. The quota may include a block quota that is representative of a limit of disk space that can be used by the user. In another embodiment, the quota may include a storage server quota that is representative of a limit of files and directories that can be created by the user. Alternatively, the quota may be usage quota, file quota, inode quota, or the like.

The quota policy database 42 may be an accounting database that stores the total usage for a user or a group of users over the designated storage set, such as the designated volume set or directory set. In one embodiment, the quota policy database 42 includes a quota configuration database 42A and a runtime usage database 42B. The quota configuration database 42A may include information such as the defined quota for one or more users. The quota configuration database 42A uses the UQEID value for the quota entries. The quota configuration database 42 may also store additional information regarding the quota configuration, such as a quota policy that includes quota definitions for one or more users of the storage system. The runtime usage database 42B may store information, such as the total usage of files or block by the user. The runtime usage database 42B also uses the UQEID value for the entries. The quota policy database 42 may also include a quota configuration database 42A that includes information such as the defined quota for one or more users, and a quota policy that includes quota definitions for one or more users of the storage system. The quota configuration database 42A may also store the user identity (e.g., user ID, group ID), total number of files or total number of blocks, destination (e.g., directory ID, volume ID, or combination of directory IDs and volume IDs), a time parameter (e.g., time to decide the valid range that the quota applies), hard and soft quotas, a quota leniency rate (e.g., available storage above soft quota, for example, 10%, before reaching the hard quota), a growth rate, which allows a user to use more storage resources over time (e.g., 1% per month increase in quota), or the like.

In one embodiment, the ID mapping database 43 includes multiple ID mapping databases, namely the UID-to-UQEID mapping database 43A, having exemplary entries illustrated in Table 1-1A, GID-to-UQEID mapping database 43B, having exemplary entries in Table 1-1B, and TID-to-UQEID mapping database 43C, having exemplary entries illustrated in Table 1-1C. It should be noted that these three ID mapping database may also be implemented in a single ID mapping database, as illustrated in FIG. 4. Each of the ID mapping databases includes entries that include the platform-specific identification value, the name of the user and the corresponding UQEID value.

TABLE 1-1A

UID-to-UQEID Mapping Database 43A

| UID | Name | UQEID |
|---|---|---|
| 100 | John | 13300024 |
| 103 | David | 13300050 |
| 104 | Mary | 13300050 |

TABLE 1-1B

GID-to-UQEID Mapping Database 43B

| GID | Name | UQEID |
|---|---|---|
| 1000 | Engineering | 13300001 |
| 1003 | Sales | 13300002 |
| 1040 | Marketing | 13300050 |

TABLE 1-1C

TID-to-UQEID Mapping Database 43C

| TID | Name | UQEID |
|---|---|---|
| 1 | /vol/vol0/Qt1 | 13300003 |
| 105 | /vol/vv3/Data_Copy | 13300004 |
| 4503 | /vol/vv3/Qt3 | 13300050 |

In one embodiment, the quota policy database 42 includes two databases, namely a quota configuration database 42A, having exemplary entries illustrated in Table 1-2A, and a runtime usage database 42B, having exemplary entries illustrated in Table 1-2B. It should be noted that these two databases may also be implemented in a single database. The quota configuration database 42A includes entries that include the UQEID value, and one or more quota policy limits, such as a file limit, a block limit, a soft file limit, a soft block limit, or the like. The runtime usage database 42B includes entries that include the UQEID value, and one or more total usage values, such as total files used and total blocks used. It should be noted that the following table use the following abbreviations, kilobytes (KB), megabytes (MB), gigabytes (GB), and terabytes (TB).

TABLE 1-2A

Quota Configuration Database 43

| | Policy (Limits) | | | |
|---|---|---|---|---|
| UQEID | File Limit | Block Limit | Soft File Limit | Soft Block Limit |
| 13300024 | 200 KB | 10 GB | 100 KB | 5 GB |
| 13300002 | 1 MB | 1 TB | 1 MB | 1 TB |
| 13300004 | 500 KB | 5 GB | 200 KB | 2 GB |
| 13300003 | 200 KB | 10 GB | 100 KB | 5 GB |
| 13300050 | 1 MB | 1 TB | 1 MB | 1 TB |
| 13300001 | 500 KB | 5 GB | 200 KB | 2 GB |

TABLE 1-2B

Runtime usage database 42B

| | Runtime Usage | |
|---|---|---|
| UQEID | Total Files | Total Blocks |
| 1330003 | 663 | 427593 |
| 1330004 | 960 | 14472343 |
| 1330050 | 455848 | 357343 |
| 1330001 | 45663 | 42017593 |
| 1330002 | 94560 | 1450472343 |

In one embodiment, for each entry of the configuration database 42A, a new UQEID is created. The UQEID may be generated in various ways, such as random number generation, sequential numbering, or the like. Each UQEID that is created corresponds to a user or a group of users on one or more platforms, for example, UNIX and WINDOWS. When defining the policy limits for the user or group of users in the quota configuration database 43, the administrator can determine that certain platform-specific identification values should be assigned to the same UQEID for quota purposes, and assign the platform-specific identification values to the same UQEID. For example, the administrator may decide that specific users should share a single quota, and assigns the same UQEID for the various platform-specific values for the specific users for data access requests from the various platforms. In one embodiment, the multiple platform-specific identification values are assigned to the same UQEID by the administrator. In another embodiment, the storage server is configured to identify which platform-specific identification values correspond to a particular user, and assigns a single UQEID to those identified platform-specific identification values using other criteria than the platform-specific identification value, such as the IP address from which the request originates level of security to access certain directories, or the like. Alternatively, the UQEID may be assigned to various platform-specific identification values using other decision criteria manually by the administrator or automatically by the storage server. In populating the quota configuration database 43, the administrator can define the policy limits for the assigned UQEID in the entry of the quota configuration database 43 for a particular user, such as illustrated in one of the exemplary entries of Table 1-2A.

Once the administrator has assigned the UQEID, the ID mapping database 42 (or 42A, 42B, and 42C) are populated with the corresponding mappings of the platform-specific identification values to the assigned UQEID. For example, once the UQEID has been assigned for a user that requests data using an UID and an SID, a lookup operation is performed in the UID-to-UQEID Mapping database 42A using the UID for the user, and the UQEID assigned to the user or group of users is inserted into the entry that corresponds to the UID. If no entry is found for the UID, one may be created to include the mapping between the UID and the UQEID for the particular user or group of users. Similarly, using the other platform-specific identification values assigned to the user, lookup operations may be performed in the respective mapping database(s), such as a SID-to-UQEID Mapping database using the SID for the user, and the UQEID corresponding to the user may be inserted in entries of the respective mapping database(s) corresponding to the platform-specific identification values for the user or group of users (e.g., SID-to-UQEID mapping). In one embodiment, if there is a lookup failure, an error is triggered and the configuration entry (e.g., configuration line) is skipped.

Once the configuration database 42A has been populated, a quota lookup procedure may be performed using the UQEID. For example, when a UNIX user tries to access the storage, the UID for the UNIX user, which is in the data access request, is used to lookup the corresponding UQEID for the user in the UID-to-UQEID Mapping database 43A. Once the UQEID has been obtained, the UQEID is used to lookup quota information in the quota configuration database 42A and the runtime usage database 42B. As part of the lookup operations in the quota configuration database 42A and the runtime usage database 42B, the quota policy is consulted, and the runtime usage for the user may be updated based on the success of the data access request. Similar, operations may be performed for CIFS users, except the SID is used to lookup the corresponding UQEID for the user, for example, in a SID-to-UQEID Mapping database (not included in the tables above).

In another embodiment, the quota policy can be defined for a group of users, such as an Engineering, which is considered to be a group of UNIX users, for example. As described above, for each entry of the configuration database 42A, a new UQEID is created. One of the created entries includes a UQEID for the UNIX group. When defining the policy limits in the quota configuration database 43, the administrator can determine that certain platform-specific identification values (e.g., GIDs of users within Engineering) should be assigned to the same UQEID for quota purposes, and assign the platform-specific identification values to the same UQEID, such as illustrated in one of the exemplary entries of Table 1-2A. The platform-specific identification values may be assigned by the administrator or the storage server, as described above.

Once the administrator has assigned the UQEID, the GID-to-UQEID Mapping database 42B is populated with the GID-to-UQEID mapping of the platform-specific identification values of the UNIX group to the assigned UQEID. For example, once the UQEID has been assigned for the UNIX group using the GID, a lookup operation is performed in the GID-to-UQEID Mapping database 42B using the GID for the UNIX group, and the UQEID assigned to the UNIX group is inserted into the entry that corresponds to the GID. If no entry is found for the GID, one may be created to include the mapping between the GID and the UQEID for the particular UNIX group. In one embodiment, if there is a lookup failure, an error is triggered and the configuration entry (e.g., configuration line) is skipped.

Once the configuration database 42B has been populated, a quota lookup procedure may be performed using the UQEID. For example, when a user of the UNIX group tries to access the storage, the GID, which is in the data access request, is used to lookup the corresponding UQEID for the user in the GID-to-UQEID Mapping database 43B. Once the UQEID has been obtained, the UQEID is used to lookup quota information in the quota configuration database 42A and the runtime usage database 42B. As part of the lookup operations in the quota configuration database 42A and the runtime usage database 42B, the quota policy is consulted, and the runtime usage for the user may be updated based on the success of the data access request.

It should be noted that the embodiments described above are intended to be examples of how the quota configuration database 42A is updated with the UQEIDs, how the ID mapping database 43 (e.g., 43A, 43B, and 43C) are updated, and how the UQEIDs are used to perform lookup operations in the quota configuration database 42A and the runtime usage database 42B. Alternatively, other platform-specific identification values may be assigned the same UQEID for monitoring and maintaining the quota for a user or a group of user.

The node 2A can access the quota policy database via the quota management system 41, for example. The quota management system 41 communicates with the quota database manager 2B storing the quota policy database 42 and the ID mapping database 43 by an interconnect line 45. The interconnect line 45 may be, for example, Ethernet, Remote Direct Memory Access (RDMA), FCP, 802.11B, or the like. In one embodiment, the quota management system 41, which sits in the data path of the node 2A between the multi-protocol engine 22A and the file system layer 21, such as illustrated in FIGS. 3 and 4, can calculate block and/or inode consumption for one or more volumes of the node. Similarly, the quota management system 41 can calculate block and/or inode consumption across one or more directories of the node.

The storage server 2A receives data access requests from one or more clients 1 via protocol layer 22, as described above. These data access requests are monitored to check for quota-sensitive data access requests by the quota management system 41. The quota-sensitive data access requests may be, for example, creating a new file, reading an existing file, deleting an existing file, or writing to an existing file to append the data of the existing file. Based on the monitoring, the quota management system 41 determines a local usage of storage resources for the user for that node. The local usage may be determined by the quota management system 41, or alternatively, by the quota database manager 2B. The local usage is determined for each of the volumes of the volume set, for example, on volume 6A and volume 6B. In another embodiment, the volume set includes volumes of node 2A and volumes of other nodes. Alternatively, the volume set may be more or less than the illustrated volumes of FIG. 4. In another embodiment, the local usage is determined for each directory of the directory set. It should be noted that although some embodiments are described as implementing a quota over a volume set or a directory set, the embodiments described herein may be used with a quota that is implemented on a single logical data container, such as a volume, a directory, or the like.

The quota management system 41 checks the quota policy to compare the total usage of the user against the quota. In one embodiment, the quota policy includes quota attributes for each user. These quota attributes may be, for example, a group, a type of group, or the like. The quota policy may also include policy parameters. These policy parameters may be, for example, the number of files or blocks allowed for a particular user, for a particular type of user, or for a particular access priority, a time interval or period, a particular type of user, or for a particular access priority. Alternatively, the policy parameters may include additional information, such as information on the users, the clients, the volumes, and the systems.

The quota policy may be stored remotely on a node, such as a quota database manager that manages a quota policy database or an additional storage server. In another embodiment, the quota policy is stored in a quota policy module. Alternatively, the quota policy may be stored locally on storage server 2A. In one embodiment, the quota policy includes a quota that defines a number of files or blocks that can be used by the user. If the total usage by the user violates the quota, such as by the number of files being used by the user being greater than the number of files allowed according to the quota, a system rule, also referred to as quota actions, can be executed, such as denying access for the particular data access request that violates the quota policy. The quota policy may also store quota actions that correspond to certain types of quota violations.

As described above, once the total usage has been determined by the quota management system 41, the total usage is compared against a quota, which is defined by a quota policy, by consulting the quota policy. The quota may include a limit on the total usage of storage resource by the user. Usage of storage resources may be limited by denying access, generating a warning, or the like. In one embodiment, the quota includes a soft-quota definition. When the soft quota is met (or exceeded), a system rule can be executed that generates a warning that the user is approaching or exceeding the quota for the user. In another embodiment, the quota includes a hard-quota definition. When the hard quota is met (or exceeded), a system rule can be executed that prevents the quota-sensitive data access request that would cause the quota to be exceeded. The system rule indicates an action that is to be performed in response to the violation of the quota policy. The quota-sensitive data access request may be a data access request for creating a new file or writing to an existing file to append the data of the existing file. In another embodiment, the quota includes a grace interval, which allows the user to temporarily violate the quota by a predetermined amount. For example, the grace interval can have a lower limit equal to the hard quota and an upper limit that is greater than the lower limit. When the grace interval has been met, a system rule can be executed that generates a warning that the user is approaching or exceeding the quota for the user, but does not prevent the quota-sensitive data access request until the upper limit is exceeded. Alternatively, the quota may include any combination of a hard-quota definition, a soft-quota definition, or a grace interval definition.

In one embodiment, the user can be limited to a quota of storage resources across the one or more nodes (e.g., storage servers). The user may be limited to a quota based on a volume set having multiple volumes on one or more nodes. Alternatively, the user may be limited to a quota based on a directory set having multiple directories on one or more nodes. Alternatively, the user may be limited to a quota for a single logical data container, such as a single volume, a single aggregate, a single directory, or the like.

In one embodiment, as illustrated in FIG. 4, the quota management is implemented between the protocol layer 22 and the file system layer 21. Alternatively, the quota management system 41 may be implemented in other layers of the operating system to monitor the data access requests to check for quota-sensitive data access requests that affect the storage resources and to calculate the affected storage resources (e.g., blocks or inodes) of the data access request, which is summed with the calculated affected storage resources of other nodes to determine the total volume set usage. Once the total volume set usage is determined, it is compared against the quota for the user to determine if the quota is violated.

In one embodiment, the logical data flow for implementing a quota includes the administrator setting up (e.g., defining or modifying) the quota for a user A for a storage set (e.g., a volume, a volume set, a directory, a directory set, an aggregate, or the like). For example, the quota may be for volume 6A on node 2A. Alternatively, the quota may be for volumes 6A and 6B (e.g., of aggregate 7) on node 2A. In other embodiments, the quota is implemented over multiple nodes. After the quota has been set up, the quota management system 41 operates to monitor data access requests and to enforce system rules based on violation of the quota based on the monitored data access requests.

Figure 5:
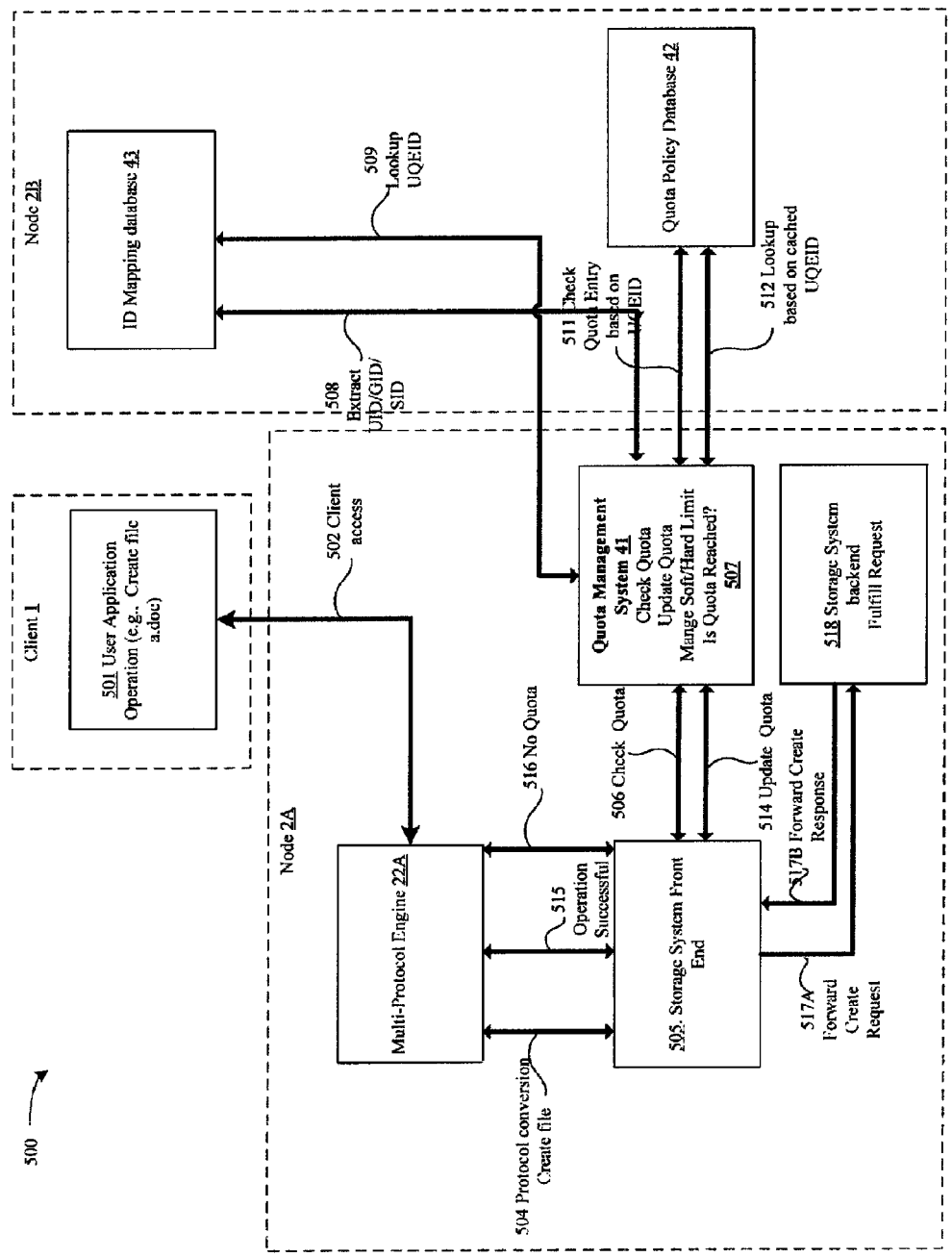
FIG. 5 is a flow chart of one embodiment of a method of a create-file access request processed by a storage system implementing a quota management system that translates platform-specific identification values into platform-independent quota identification values.

FIG. 5 is a flow chart of one embodiment of a method 500 of a create-file-access request processed by a storage system implementing a quota management system that translates platform-specific identification values into platform-independent quota identification values. As part of the method 500, a quota policy can be created and stored, such as in a quota database manager of node 2B or in memory of node 2A. In particular, a quota configuration database 42A of the quota database manager may store a multiple-node quota policy, which includes a quota definition that defines the quota for a particular user to storage resources of the storage system, for example, a volume quota. The quota definition may include policy parameters, such as a user entity, such as an individual user or a group of users, a data entity, such as a node, a node and volume, a cluster, or a node, volume, and directory, and a quota, such as a specified amount of storage units for the particular user (or group). In this particular embodiment, the data entity may be one or more volumes of a volume set. The quota may be specified by units of storage, such as kilobytes (KB), megabytes (MB), gigabytes (GB), terabytes (TB), or the like. For example, user A can have a quota of 100 GB in the volume set (e.g., 100 GB in volume 6A of node 2A and volume 6B of node 2A). Alternatively, the quota for user A may be 100 GB in a directory set (e.g., 100 GB in directory 1 of volume 6A of node 2A and directory 2 of volume 6B of node 2A). Alternatively, the quota may include other limits in different or similar configurations. Alternatively, the policy parameters may include additional information, such as information on the users, the clients, the volumes, applications, and the systems. The particular types of data access requests may include read data access request, read directory data access request, open file data access request, read attribute data access request, write data access request, create file data access request, or the like. In another embodiment, the policy parameter includes information that identifies an access source, such as and IP address from which the client is accesses storage resources.

In another embodiment, the quota policy has already been created and the administrator modifies the quota policy to set the quota for the particular user and/or group of users.

Once the quota policy has been created or modified and stored in the quota policy database 42, as described above, the quota policy may be updated in the quota management system 41 of node 2A. For example, a user-level program may load the configuration and send it to the quota management system 41, for example, by a user-to-kernel level communication, such as through, for example, shared memory, driver system call (e.g., IO control (IOCTL) call), TCP socket call, remote procedure call (RPC), or the like.

Once the quota management system 41 has been updated with the quota configuration, a user or an application running on a client may attempt to perform a user-application data access request, such as a create-file data access request, a read-file data access request, a write-to-file data access request, a append block data access request, or the like, which requires a client to access data (e.g., files) stored in the storage system, operation 501.

As described above, the storage system may include a storage server as the node 2A, and a quota database manager as the node 2B, which includes the quota policy database 42 and the ID mapping database 43. As described above, the storage server includes the multi-protocol engine 22A that services client accesses 502. The multi-protocol engine 22A receives client accesses 502, and in response performs protocol conversion of the client accesses 502 corresponding to the client create-file data access request in operation 504. The client access 502 may be NFS or CIFS protocol requests, such as data access requests (e.g., a write access request) received over an Ethernet port or other types of network ports. The client sends the data access request to the multi-protocol engine 22A according to the individual protocol specification. It should be noted that although the client access is described as being performed remotely over a network, alternatively, access can also be done locally.

As described above, the multi-protocol engine 22A receives the data access request from the client. Then the multi-protocol engine 22A parses the data access request, converts the request into a system internal request, and forwards the create request to the front end of the storage system operating system 505. The front end of the storage system operating system may include operations performed by the file system layer 21 that is configured to check and update the quota based on the received requests. The storage system operating system (e.g., front end) 505 consults with the quota management system 41, for example, to check whether a particular data request violates the quota, operation 506. The quota management system 41 at operation 507 checks the quota, updates the quota, manages soft/hard limits according to the quota policy, and determines whether the quota has been reached, as described in more detail below. Alternatively, the quota management system 41 manages the hard and soft quota limits of the quota policy database 42, in addition to the operation described in operation 507. Once the quota management system 41 has performed the operations, the quota management system 41 updates the quota on the storage system front end 505, at operation 514. In response to the update, the storage system front end 505 forwards the create request at to the back end of the storage system 518 to fulfill the request, operation 517A. The back end of the storage system may include operation performed by the file system layer 21, storage access layer 24, and the storage drivers 25. Once the request has been fulfilled, the create response is forwarded at operation 517B by the storage system backend 518, and the storage system front end 505 indicates that the data access request was successful at operation 515. If the quota management system 41 determines that the quota has been violated, the storage system front end 505 indicates that that there is "no quota" available at operation 516. In one embodiment, the "no quota" operation includes a preconfigured error code, such as EQUOTA, which means that the user has used more storage resources than allocated by the quota (e.g., no remaining quota for this data access request). For example, as described below, the response data may indicate that the data access request should be denied because it violates the quota policy. The response data may include the quota action as triggered in response to violating the quota policy. Alternatively, the response data may indicate other operations, as defined by the quota policy. On the return path, the multi-protocol engine 22A converts the internal response to IO response via the designated protocol, and forwards to the user application 501.

The quota management system 41 may be configured to perform various operations. The quota management system 41 is configured to monitor and detect quota-sensitive data access requests based on the quota policy. For example, user A has a quota of 100 GB on the volume set, such as volumes 6A and 6B on node 2A. If the data access request is not quota sensitive, the method moves to operation 517A to forward the request to the back end of the storage system 518 to fulfill the request in the file system. For quota accounting on the storage system, the quota may be based on client entity, such as a user, or a group of users, and the target entity, such as a volume, directory, node, or cluster. The total quota may be a number that reflects the total block consumption or inode consumption based on the client and/or target entity.

If, however, a quota-sensitive data access request is detected, by the quota management system 41, the quota management system 41 checks the quota-sensitive data access request against the quota. The quota management system 41 extracts from the data request an identification value, at operation 508. The identification value is an identification type that is specific to the platform from which the particular data request originated. The quota management system determines a platform-independent identification value (e.g., UQEID) for the extracted platform-specific identification value, by performing a lookup operation in the identification mapping database 43, at operation 509, by using a particular platform-specific identification value to determine the UQEID value. The platform-specific identification values may be, for example, a user identification for a general-purpose operating system, such as a UID or a GID for a UNIX platform, a TID for a storage server operating system, such as the Data ONTAP storage server operating system, or an SID for a general-purpose operating system, such as for a WINDOWS platform.

Before determining the UQEID value from the ID mapping database 43, a particular UQEID value is created for each user. The UQEID is mapped to one or more platform-specific identification values (e.g., UID, GID, TID, SID, or the like), which correspond to the user requests from one or more platforms. For example, an entry of the identification mapping database 43 maps all the various platform-specific identification values to the UQEID value, as described above. The UQEID value is subsequently associated with the request to determine whether a particular data request violates a quota.

A quota policy database 42 can be implemented on a node-independent accounting database, such as quota database manager 2B. The quota policy database 42 is used to store information for the global quota (e.g., total usage and total quota). In one embodiment, the quota policy database includes a table, as described above with respect to Table 1-2. Alternatively, other types of data stores can be used to store the quota policy limits and the total runtime usages of a user or a group of users. Also, information regarding the client entity, the total usage, the quota type, the target entity may be stored in the quota policy database 42.

In operation 511, the quota management system 41 calculates results for multiple data access requests by checking quota policy database 42. The quota management system 41 at operation 511 checks the quota policy entry based on the UQEID value. For example, in one embodiment of a create-file data access request, the quota management system checks the quota policy database 42 that stores the quota and total usage over multiple nodes across multiple nodes, to see if intended create-file request would meet or exceed the quota (e.g., soft or hard quota). In another embodiment for a write data access request, the quota management system checks the quota policy database 42 to see if the intended write would meet or exceed the quota (e.g., hard or soft). In one embodiment, a cached copy, such as a read-only copy, of all or a portion of the quota policy database is stored locally on the storage server 2A to facilitate access on the respective nodes. The cached copy may be used to facilitate an expedited lookup operation to determine whether the quota has been violated or not for the particular data access request. In another embodiment, a ticket is used to decide how long to keep the cached copy on the respective node.

In another embodiment, the quota management system 41, at operation 512, performs a lookup operation to the quota policy database 42 based on a cached copy of the UQEID value. The cached copy of the UQEID may be used to facilitate an expedited lookup operation to determine the UQEID for the previously identified platform-specific identification value. In another embodiment, the lookup operation to the mapping database is performed prior to the lookup operation to the quota policy database. Alternatively, other types of operations may be performed in a similar or dissimilar order as above, to check the quota in the quota policy database based on the UQEID value.

In another embodiment of creating a new file, the data access request of creating a new file can be denied if the total number of files associated with the user is over the hard limit. Alternatively, the storage system may limit the total usage, as well as the amount of data storage on a particular node or volume. In another embodiment, the quota policy can be set up to limit the total number of files in a multiple directories on the same or different node. Each successful new entry of file or directory may increment the total by one, but a failed data access request does not change the quota policy entry.

In one embodiment, for some data access requests, such as non-quota-sensitive data access requests, the quota management system does not check or update the quota. However, for appending existing blocks or new write data access requests, the quota policy database is checked to determine that the append or new write data access request does not meet or exceed the quota. It should be noted that normally one append data access request affects only one volume. As described above, the quota policy database 42 is checked using the UQEID value, instead of the various platform-specific identification values from the various platforms. In another embodiment for a truncation data access request, the quota management system does not do a quota check, but needs to update the result of the truncation data access request. Similarly, in another embodiment of a partial write data access request, the quota management system only updates the actual addition of the write.

As described above, the identification mapping database 43 stores entries. For example, the identification mapping database 43 may include multiple entries that correspond to a single user A, such as the following: UID 100 (User A)→UQEID 100 (User A), GID 200 (User A)→UQEID 100 (User A), TID 300 (User A)→UQEID 100 (User A), and SID 400 (User A)→UQEID 100 (User A). Tables 1-1A, 1-1B, and 1-1C illustrate the contents of exemplary entries of the ID mapping database 43 according to one embodiment; alternatively, other types of data stores may be used to store the ID mapping information for the platform-specific and platform-independent identification values. In this example, each entry from each of the platforms is associated with the UQEID value (e.g., UQEID 100 (User A)). Alternatively, the entries of the identification mapping database 43 may include more or less information than these examples.

As described above, the quota policy database 42 stores quota policy entries. For example, a quota policy entry may be based on the block consumption for the user, such as UQEID 100 (User A)—Node1/Vol1 70 GB, and UQEID 100 (User A)—Node2/Vol1 25 GB. The entry may also be based on the inode consumption for the user, such as UQEID 100 (User A)—Node1/Vol1, 10,545, and UQEID 100 (User A)—Node 2/Vol1, 10,211. In this example, each quota policy entry is associated with the UQEID value (e.g., UQEID 100 (User A)). Table 1-2A illustrates the contents of exemplary entries of the quota configuration database 43, and Table 1-2B illustrates the contents of exemplary entries of the runtime usage database 42B according to one embodiment. Alternatively, other types of data stores may be used to store the quota configuration and runtime usage information for the platform-independent identification values. Alternatively, the quota entries may include more or less similar and dissimilar information than these examples.

In response to a quota violation, a system rule can be executed. In one embodiment, the system rule includes generating a "no quota" message at operation 516. Alternatively, other system rules can be executed in response to determine that the quota is violated. In one embodiment, if the quota policy evaluation determines that the quota-sensitive data access request is to be denied, the quota management system rejects the quota-sensitive data access request by providing the data access request with some specific error code to indicate that the user has used more storage resources than allocated by the quota. The access denial may be performed according to a hard-quota definition. Alternatively, other actions may be configured in operation 516, such as generating and/or sending an alert or warning, such as defined by a soft-quota definition.

If the quota management system 41 determines that quota is not violated by the current data access request (or if the received data access request is not a quota-sensitive data access request), the IO request is forwarded to the file system (e.g., back end of the storage system 518) to fulfill the request at operation 517A, as described above. The file system of the storage system back end 518 receives the incoming requests, processes the requests, sends the request to the storage access layer 24 and the storage drivers 25 for processing, and upon receiving the results from the storage access layer 24 and the storage drivers 25, the file system layer 21 processes the results by packaging the result into the response data, and forwards the response data on the return path to the storage front end 505 or to the quota management system 41.

Based on the result of a successful data access request, the quota management system updates the quota policy database 42, operation 514. In order to speed up the update process, in one embodiment, the updates are performed asynchronously. In another embodiment, the other nodes have a cached copy of a portion of the quota policy database and/or of the mapping database, such as by a valid ticket, and a refresh on this particular node notifies the ticket holder on the other nodes for the given portion that is being updated.

It should be noted that the operations described above may be performed on separate nodes. For example, each node receives data access requests that are monitored by the quota management system on the respective node, and based on receiving quota-sensitive data access requests, the above-described operations are performed separately on each node. The quota database manager 2B allows the total usage to be tracked by way of the quota management system on the node 2A, and allows the total usage to be compared against a quota stored on in the quota policy database to limit the user to the quota defined for multiple volumes across multiple nodes.

The quota database manager 2B uses the mapping database to map various platform-specific identification values to a UQEID value. The UQEID value is used by the quota management system to check and update the quota policy database. Alternatively, the quota database manager 2B can access local accounting for each of the volumes to determine the total volume usage, and compare the total volume usage against the volume quota. In another embodiment, the directory usage may be tracked over multiple volumes of one or more nodes, and a user can be limited to a directory quota over the multiple directories.

It should be noted that although the above embodiments have been described with respect to a quota management system of a storage server, the embodiments described herein may also be implemented in other types of servers to perform other types of operations, such as, for example, a charge-back application. A charge-back system keeps track of system and storage usage of a particular user or group, and charges the particular user or group based on the usage. The embodiments described herein can be used to identify the particular user or group. The operations and configurations as described herein may be used to implement the charge-back system that utilizes platform-independent identification values to keep track of system and storage usage for the particular user. Alternatively, other configurations may be used to implement the charge-back system, such as, for example, in a client-based server, instead of in a storage server.

Embodiments of the present invention include various operations, as described above. These operations may be performed by hardware components, software, firmware, or a combination thereof. The various operations may be performed by executing one or more computer programs to perform functions of the embodiments by operating on input data and generating output data. The various operations may also be implemented in, for example, special purpose logic circuitry, e.g., a field programmable gate array (FPGA), digital signal processor (DSP), Application-specific integrated circuit (ASIC), programmable logic device (PLD), or the like).

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing device(s) described herein may include one or more general-purpose processing devices such as a microprocessor or central processing unit, a controller, or the like. Alternatively, the digital processing device may include one or more special-purpose processing devices such as a DSP, an ASIC, an FPGA, or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in alternate orders or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:

receiving a quota-sensitive data request from a user at one of a plurality of storage servers clustered in a data storage system, wherein the quota-sensitive data request includes a platform-specific identification value and changes an amount of storage resources of the data storage system used by the user, wherein the plurality of platform-specific identification value is at least one of the following:

a user identification for a general-purpose operating system (UID);

a group identification for a general-purpose operating system (GID);

a tree identification for a storage server operating system (TID); and a security identification for a general-purpose operating system (SID);

translating the platform-specific identification value into a platform-independent identification value for the user, wherein the platform-specific identification value is based on a platform from which the quota-sensitive data request originated, and wherein the platform-independent identification value is assigned to the user and corresponds to the same user regardless of the platform from which the quota-sensitive data request originated, wherein said translating comprises performing a lookup in a local, cached copy, of at least a portion of an identification mapping database that stores one or more mappings between platform-specific identification values and platform-independent identification values for a plurality of entities across the plurality of storage servers clustered in the data storage system;

determining whether the quota-sensitive data request violates a quota assigned to the user using the platform-independent identification value, wherein the quota is a limit of an amount of storage resources allocated to the user, and wherein said determining comprises:

performing a lookup, using the platform-independent identification value, in a local, cached copy of a quota policy database that stores an amount of storage resources used by each of the plurality of entities and a quota limit of an amount of storage resources allocated to each of the plurality of entities to determine the amount of storage resources used by the user, wherein the local quota policy database is a cached copy of at least a portion of a remote quota policy database that stores the amounts of storage resources and the quota limits for the plurality of entities across the plurality of storage servers clustered in the data storage system, wherein the remote quota policy database tracks the amounts of storage resources used by the plurality of entities according to platform-independent identification values corresponding to the plurality of entities across the plurality of storage servers clustered in the data storage system;

determining a changed amount of storage resources by the quota-sensitive data request;

calculating an updated amount of storage resources used by the user using the amount of storage resources used by the user and the changed amount; and comparing the updated amount against the quota assigned to the user;

executing a system rule when the quota-sensitive data request violates the quota; and processing the quota-sensitive data request when the quota-sensitive data request does not violate the quota.

2. The method of claim 1, further comprising creating an entry in the identification mapping database that maps the platform-specific identification value to the platform-independent identification value.

3. The method of claim 1, further comprising updating quota information in the quota policy database after said executing the system rule or after said processing the quota-sensitive data request.

4. The method of claim 3, wherein updating the quota information comprises:

performing a lookup operation in the quota policy database using a cached copy of the platform-independent identification value that corresponds to the quota-sensitive data access request; and updating a quota entry of the quota policy database by increasing a value in a field indicating the updated amount of storage resources by the user.

5. The method of claim 1, wherein executing the system rule comprises at least one of the following:

generating a warning that the user has violated a soft-quota definition of the quota assigned to the user; and denying the quota-sensitive data request that would exceed the quota.

6. The method of claim 1, wherein the quota comprises at least one of a block quota, a file quota, and an inode quota, and wherein the amount of storage resources used by the user comprises at least one of a block usage and a file usage.

7. The method of claim 1, wherein the quota comprises a grace interval, which allows the user to temporarily violate their quota by a predetermined amount, and wherein said executing the system rule comprises generating a warning that the user has exceeded the quota assigned to the user.

8. A method, comprising:

receiving a quota-sensitive data request for storage resources from a user at one of a plurality of storage servers clustered in a data storage system, wherein the quota-sensitive data request includes a platform-specific identification value and changes an amount of storage resources of the data storage system used by the user, wherein the platform-specific identification value is based on a platform from which the quota-sensitive data request originated;

performing a first lookup operation on a first data store to determine a platform-independent identification value using the platform-specific identification value that corresponds to the user, wherein the first data store is a cached copy of at least a portion of an identification mapping data store that stores one or more mappings between platform-specific identification values and platform-independent identification values for a plurality of entities across the plurality of storage servers clustered in the data storage system, wherein the platform-independent identification value is assigned to the user and corresponds to the same user regardless of the platform from which the quota-sensitive data request originated, wherein the first data store stores multiple platform-specific identification values that correspond to the user that map to the platform-independent identification value;

translating the platform-specific identification value of the quota-sensitive data request into the platform-independent identification value;

performing a second lookup operation on a second data store using the platform-independent identification value, wherein performing the second lookup operation comprises searching for a quota policy entry identified by the platform-independent identification value in a local, cached copy, of a quota policy data store that stores an amount of storage resources used by each of the plurality of entities and a quota limit of an amount of storage resources allocated to each of the plurality of entities, wherein the local quota policy data store is a cached copy of at least a portion of a remote quota policy data store that stores the amounts of storage resources and the quota limits for the plurality of entities across the plurality of storage servers clustered in the data storage system, wherein the remote quota policy database tracks the amounts of storage resources used by the plurality of entities according to platform-independent identification values corresponding to the plurality of entities across the plurality of storage servers clustered in the data storage system, and wherein the quota policy entry stores a quota of storage resources assigned to the user and the amount of storage resources used by the user, wherein the quota is a limit of an amount of storage resources allocated to the user;

determining an updated amount of storage resources used by the user using the amount of storage resources used by the user and a changed amount of storage resources by the quota-sensitive data request;

determining whether the updated amount would violate the quota of storage resources assigned to the user;

executing a system rule when the quota-sensitive data request violates the quota; and processing the quota-sensitive data request when the quota-sensitive data request does not violate the quota.

9. The method of claim 8, wherein the plurality of platform-specific identification value is at least one of the following:

a user identification for a general-purpose operating system (UID);

a group identification for a general-purpose operating system (GID);

a tree identification for a storage server operating system (TID); and a security identification for a general-purpose operating system (SID).

10. A storage server of a cluster of storage servers in a data storage system, comprising:
a processor;
a first communication interface through which to communicate with a plurality of clients, wherein the plurality of clients are different platforms; and
a memory storing a first local data store and a second local data store and instructions which configure the processor to determine whether a quota-sensitive data request violates a quota of storage resources assigned to an entity by:
receiving a plurality of data requests from the entity at the first communication interface from the different platforms, wherein each of the plurality of data request includes a platform-specific identification value based on the particular platform from which each of the plurality of data requests originated;
determining if each of the plurality of data requests is a quota-sensitive request that changes an amount of storage resources associated with the storage server used by the entity;
for each of the quota-sensitive requests, translating each of the platform-specific identification values of each of the plurality of data requests into a platform-independent identification value, wherein said translating comprises
performing a first lookup operation in the first local data store using each of the platform-specific identification values to determine the platform-independent identification value that corresponds to the entity, wherein the first local data store is a cached copy of at least a portion of an identification mapping data store that stores one or more mappings between platform-specific identification values and platform-independent identification values for a plurality of entities across the plurality of storage servers clustered in the data storage system, wherein the first local data store stores entries that map each of the platform-specific identification values of the different platforms, which all correspond to the same entity, to the platform-independent identification value for the entity;
for each of the quota-sensitive requests, determining whether the respective quota-sensitive requests violates the quota assigned to the entity, wherein the quota is a limit of an amount of storage resources allocated to the entity, wherein said determining comprises
performing a second lookup operation in the second local data store using the platform-independent identification value for the entity, wherein the second local data store is a cached copy of a quota policy database that stores an amount of storage resources used by each of the plurality of entities and a quota limit of an amount of storage resources allocated to each of the plurality of entities to determine the amount of storage resources used by the user, wherein the local quota policy database is a cached copy of at least a portion of a remote quota policy database that stores the amounts of storage resources and the quota limits for the plurality of entities across the plurality of storage servers clustered in the data storage system, wherein the remote quota policy database tracks the amounts of storage resources used by the plurality of entities according to platform-independent identification values corresponding to the plurality of entities across the plurality of storage servers clustered in the data storage system, and wherein the second local data store stores the quota of storage resources assigned to the entity and the amount of storage resources used by the entity;
determining an updated amount of storage resources used by the entity using the amount of storage resources used by the entity and a changed amount of storage resources by the quota-sensitive data request; and
determining whether the updated amount would violate the quota of storage resources assigned to the entity; and
executing a system rule when the quota-sensitive data request violates the quota; and
processing the quota-sensitive data request when the quota-sensitive data request does not violate the quota.

11. The storage server of claim 10, wherein the instructions configure the processor to execute a system rule when one of the plurality of data access requests would violate the quota for the entity.

12. The storage server of claim 11, wherein said executing the system rule comprises at least one of:
generating a warning that the entity is approaching or exceeding the quota for the entity; and
denying the particular data request that would exceed the quota.

13. The storage server of claim 10, wherein each of the plurality of platform-specific identification values is at least one of the following:
a user identification for a general-purpose operating system (UID);
a group identification for a general-purpose operating system (GID);
a tree identification for a storage server operating system (TID); and
a security identification for a general-purpose operating system (SID).

14. A non-transitory machine-readable storage medium storing instructions thereon, which when executed by a processor cause the processor to perform a method, the method comprising:
performing a first lookup operation of a first data store to determine a platform-independent identification value that corresponds to a user using a first platform-specific identification value of a first data request from the user on a first platform, wherein the first platform-specific identification value is based on the first platform from which the first data request originated, wherein the first data store is a cached copy of at least a portion of an identification mapping data store that stores one or more mappings between platform-specific identification values and platform-independent identification values for a plurality of entities across the plurality of storage servers clustered in the data storage system, and wherein the first data store stores an entry that maps the user's first platform-specific identification value to the user's platform-independent identification value;
determining if the first data request is quota sensitive, wherein the first data request is quota sensitive when the first data request changes an amount of storage resources of the data storage system used by the user;
if the first data request is quota-sensitive, translating the first platform-specific identification value of the first data request into the platform-independent identification value;

performing a second lookup operation of the first data store to determine the platform-independent identification value that corresponds to the user using a second platform-specific identification value of a second data request from the user on a second platform, wherein the second platform-specific identification value is based on the second platform from which the second data request originated, and wherein the first data store stores an entry that maps the second platform-specific identification value to the platform-independent identification value;

determining if the second data request is quota sensitive, wherein the second data request is quota sensitive when the second data request changes the amount of storage resources used by the user;

if the second data request is quota-sensitive, translating the second platform-specific identification value of the second data request into the platform-independent identification value; and performing a third lookup operation in a second data store using the platform-independent identification value to determine whether the first data request violates a quota assigned to the user, wherein the second local data store is a cached copy of a quota policy database that stores an amount of storage resources used by each of the plurality of entities and a quota limit of an amount of storage resources allocated to each of the plurality of entities to determine the amount of storage resources used by the user, wherein the local quota policy database is a cached copy of at least a portion of a remote quota policy database that stores the amounts of storage resources and the quota limits for the plurality of entities across a plurality of storage servers clustered in the data storage system, wherein the remote quota policy database tracks the amounts of storage resources used by the plurality of entities according to platform-independent identification values corresponding to the plurality of entities across the plurality of storage servers clustered in the data storage system, and wherein the first data request violates the quota when a changed amount of storage resources by the first data request would cause the amount of storage resources used by the user to exceed the quota.

15. The machine-readable storage medium of claim 14, wherein the method further comprises:
    executing a system rule when the first data request violates the quota; and
    processing the quota-sensitive data request when the first data request does not violate the quota.

16. The machine-readable storage medium of claim 15, wherein the method further comprises:
    performing a fourth lookup operation in the second data store using the platform-independent identification value to determine whether the second data request violates the quota assigned to the user, wherein the second data request violates the quota when a changed amount of storage resources by the second data request would cause the amount of storage resources used by the user to exceed the quota;
    executing a system rule when the second data request violates the quota; and
    processing the quota-sensitive data request when the second data request does not violate the quota.

17. A system, comprising:
    a plurality of storage servers clustered in a data storage system;
    a plurality of storage resources coupled to the plurality of storage servers;
    a set of one or more storage devices comprising:
        an identification mapping database that stores a plurality of entries that map a plurality of platform-specific identification values that correspond to a same entity on a plurality of different platforms to a platform-independent identification value assigned to the entity; and
        a quota policy database that stores an entry for the platform-independent identification value assigned to the entity that includes an amount of storage resources used by the entity and a quota limit of an amount of storage resources allocated to the entity, wherein each of the plurality of storage servers stores a local cached copy of at least a portion of the identification mapping database and a local cached copy of at least a portion of the quota policy database;
    a quota management system, executing on each of the plurality of storage servers, coupled to communicate with the identification mapping database and the quota policy database, wherein the quota management system is configured to:
    receive a data request from the entity on one platform of the plurality of different platforms,
    determine if the data request is a quota-sensitive request that changes the amount of storage resources used by the entity,
    perform a first lookup operation in the local cached copy of the identification mapping database using a particular platform-specific identification value for the entity on the one platform from which the data request originated to determine the platform-independent identification value that corresponds to entity when the data request is quota-sensitive,
    translate the particular platform-specific identification value of the data request to the platform-independent identification value when the data request is quota-sensitive,
    perform a second lookup operation in the local cached copy of the quota policy database using the platform-independent identification value to determine the amount of storage resources used by the entity,
    determine an updated amount of storage resources used by the entity using the amount of storage resources used by the entity and a changed amount of storage resources by the quota-sensitive data request;
    determine whether the updated amount would violate the quota of storage resources assigned to the entity;
    execute a system rule when the data request violates the quota; and
    process the quota-sensitive data request when the quota-sensitive data request does not violate the quota.

* * * * *